A. T. EARL AND W. B. HUNKINS.
ADJUSTABLE DOOR BUMPER.
APPLICATION FILED NOV. 11, 1920.

1,409,137.

Patented Mar. 7, 1922.

INVENTORS
ARTHUR T. EARL
WILLIAM B. HUNKINS
BY *Hazard & Miller*
ATT'YS.

UNITED STATES PATENT OFFICE.

ARTHUR T. EARL, OF LOS ANGELES, AND WILLIAM B. HUNKINS, OF HOLLYWOOD, CALIFORNIA.

ADJUSTABLE DOOR BUMPER.

1,409,137.   Specification of Letters Patent.   Patented Mar. 7, 1922.

Application filed November 11, 1920. Serial No. 423,357.

*To all whom it may concern:*

Be it known that we, ARTHUR T. EARL and WILLIAM B. HUNKINS, citizens of the United States, residing at Los Angeles and at Hollywood, respectively, in the county of Los Angeles and State of California, have invented new and useful Improvements in Adjustable Door Bumpers, of which the following is a specification.

It is the object of this invention to provide an adjustable bumper to be employed in connection with doors and the like. The bumper includes a resilient member which as it is worn away through contact by a door, may be readily adjusted with relation to the casing forming a mounting for the same, so as to again form a yieldable contact for the door.

The invention will be readily understood from the following description of the accompanying drawings, in which.

Figure 1:
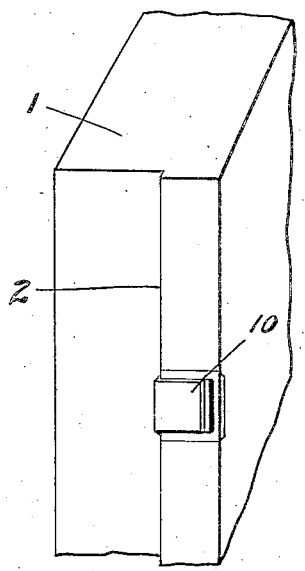
Figure 1 is a perspective view of a portion of a door frame showing the improved bumper mounted upon the same.
Figure 2:
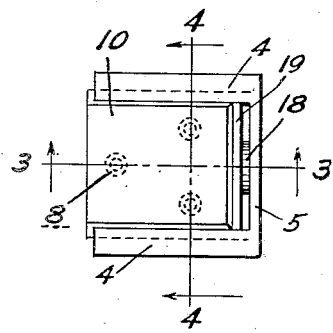
Fig. 2 is a front elevation of the bumper.
Figure 4:
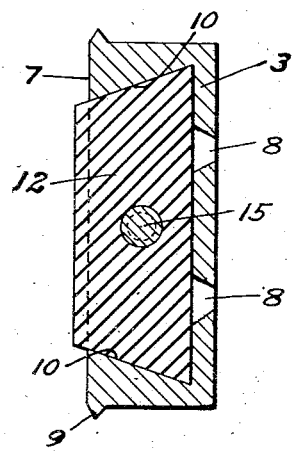
Figure 3:
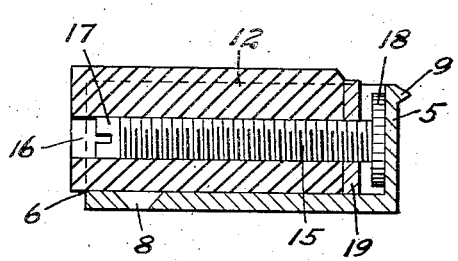

Figs. 3 and 4 are detail sections on the lines 3—3 and 4—4 of Fig. 2.

The door frame which is provided with the usual stop to limiting the swing of the door and the improved bumper is mounted in stop 2 so that the end of the resilient member of said bumper projects beyond the edge of said stop, which is contacted by the door when the latter is closed. As a consequence this resilient member will form cushioning means for the door.

The bumper comprises a frame having a base 3, side walls 4, and an end 5. The other end of the frame is open as shown at 6, and the frame as thus constructed is sunk into stop 2 with the top surfaces 7 of walls 4 and 5 preferably flush with the surface of the stop, and the open end 6 positioned at the edge of the stop engaged by the door. The frame may be held in position by suitable screws received through screw holes 8 provided in the base 3, and by means of a rib 9 provided around the edge of walls 4 and 5 adjacent the top surface 7.

The inner surfaces of walls 4 are preferably tapered as shown at 10 to form a groove extending from the open end 6 into the frame, provided with undercut sides. A resilient member shown as a block of rubber 12 is received within the groove formed in the bumper frame, and said block is provided with beveled sides adapted to fit against the undercut sides of the frame groove. By this arrangement the rubber bumper is held against movement within its frame except in a direction outwardly through the open end 6. The bumper is positioned within its frame so as to project beyond end 6 to form a yieldable stop for the door.

The mechanism for adjusting the rubber bumper so that the latter will project beyond the open end 6 as it is worn away, comprises a screw bolt 15 extending through a bore 16 provided in the rubber block 12. The outer end of the screw bolt is provided with a grooved head 17 arranged to be engaged by a screw driver, and the inner end of the screw bolt is provided with a head 18 abutting against end wall 5. A plate 19 fits snugly within the groove of the bumper frame between head 18 and the rubber block so that said plate is held against rotation, and the screw bolt 15 is threaded through this plate. As a consequence rotation of the screw bolt will move plate 19 outwardly through the groove of the bumper frame, and the rubber block will thereby be moved outwardly as it becomes worn. It will be understood that screw bolt 15 may be readily engaged by a screw driver for rotating the same through the end of bore 16 extending to the outer end of the bumper block.

Various changes may be made in the construction as thus set forth without departing from the spirit of the invention as claimed.

What is claimed is:

A bumper comprising a frame open at one end and having a dove-tail groove formed therein, a rubber block slidable in the frame and of dove-tail form in cross section to have a sliding fit within the frame, a screw extending loosely through the block, a head on one end of the screw for rotating engagement with one wall of the frame, and a plate threaded on the screw and abutting the block, said plate being of the same contour as the groove and having a sliding fit therein.

In testimony whereof we have signed our names to this specification.

ARTHUR T. EARL.
WILLIAM B. HUNKINS.